Feb. 28, 1950      A. P. BALL      2,498,846
ROTARY VALVE INTERNAL-COMBUSTION ENGINE
Filed Sept. 7, 1945      2 Sheets-Sheet 1

INVENTOR.
Albert P. Ball.
BY
    Gray & Smith
    ATTORNEYS.

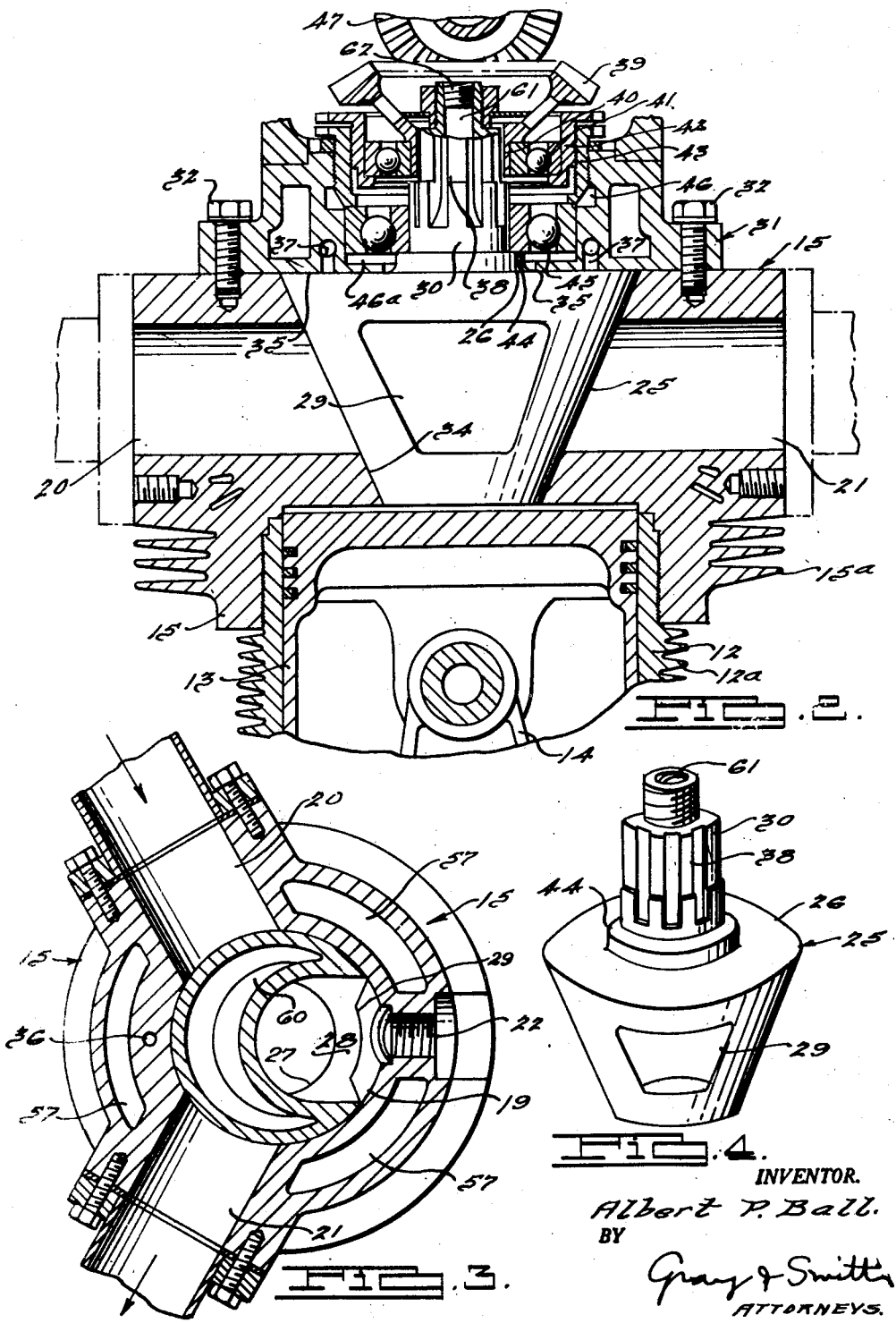

Patented Feb. 28, 1950

2,498,846

UNITED STATES PATENT OFFICE 2,498,846

ROTARY VALVE INTERNAL-COMBUSTION ENGINE

Albert P. Ball, Detroit, Mich., assignor to Briggs Manufacturing Company, Detroit, Mich., a corporation of Michigan Application September 7, 1945, Serial No. 614,849

1 Claim. (Cl. 123—80)

This invention relates to internal combustion engines and particularly to engines of the class which are provided with rotatable valves, preferably although not necessarily rotating conterably although not necessarily rotating continuously in one direction, for controlling the intake and firing of the combustible charge or fuel mixture and for exhausting the products of combustion. The present invention relates particularly to the valve mechanism of such engines and in its broader aspects is applicable to engines in which the valve rotates continuously in one direction or rotates in an oscillatory manner.

The present application is a continuation-in-part of my abandoned application Serial No. 424,724, filed December 29, 1941.

In the present preferred embodiment of this invention the rotatable valve is mounted in the cylinder head and is formed with substantially all or at least the major portion of the combustion chamber. Moreover, in the illustrated embodiment the valve or rotor is substantially frusto-conical in construction having an opening or port in the side of the valve adapted to communicate with an intake or exhaust passage, or both as the case may be, and also an opening or port at the inner end or bottom of the valve leading to the cylinder. With the exception of these ports the combustion chamber is otherwise entirely enclosed or housed within the walls of the valve member or rotor. The combustible charge within the combustion chamber of the valve is fired preferably by spark ignition although in its broader aspects the invention is not considered to be so limited.

Serious problems have been encountered heretofore in the production of a satisfactory engine of the foregoing kind, particularly because of the inability to obtain sufficient power output or maintain efficient and sustained high speed performance, such as required for engines used in aircraft. Some of the principal problems or difficulties have been in connection with the lubrication of the rotary valve, satisfactory control and reduction of oil consumption, elimination of gas leakage and consequent power loss during the power and compression strokes of the piston, and the provision of adequate properly lubricated bearings of simplified nature for the valve in order to prevent reduction in power output due to excessive friction, scoring and wear of the valve.

An object of the present invention is to overcome some or all of the foregoing difficulties by providing an improved internal combustion engine of the rotatable valve type which will have improved power characteristics, will be capable of meeting exacting requirements in respect to sustained operation, and will have longer life while maintaining a more nearly constant performance rating during such long usage.

A further object of the invention is to provide an engine of the foregoing class having improved bearing means for the valve and improved means for sealing the exhaust opening particularly at the time of firing the charge in the valve combustion chamber.

A further object of the present invention is to provide improved means for lubricating the rotary valve, and especially a rotary valve of the generally frusto-conical type having tapering side walls which during operation have bearing engagement in correspondingly shaped walls of the valve cavity in the cylinder head, such lubricating means being constructed to convey lubricating oil to the valve at points preferably unexposed to the valve side port and at the high pressure side of the cavity opposite the spark plug or at the time of firing. As a result of this construction adequate lubrication is assured at bearing surfaces under greatest load at the time of firing while at the same time an appreciable reduction in oil consumption is achieved.

Other objects of this invention will appear in the following description and appended claim, reference being had to the accompanying drawings forming a part of this specification wherein like reference characters designate corresponding parts in the several views.

Fig. 2 is a fragmentary vertical sectional view on a larger scale of the top of the cylinder and the cylinder head of the engine illustrated in Fig. 1, the section being taken through the intake and exhaust conduits thereof.

Fig. 3 is a transverse sectional view of the intermediate section of the cylinder head, taken in the direction of the arrows on the section plane passing through the section line 3—3 of Fig. 1.

Fig. 4 is a perspective view illustrating the rotary valve separately.

Figure 1:
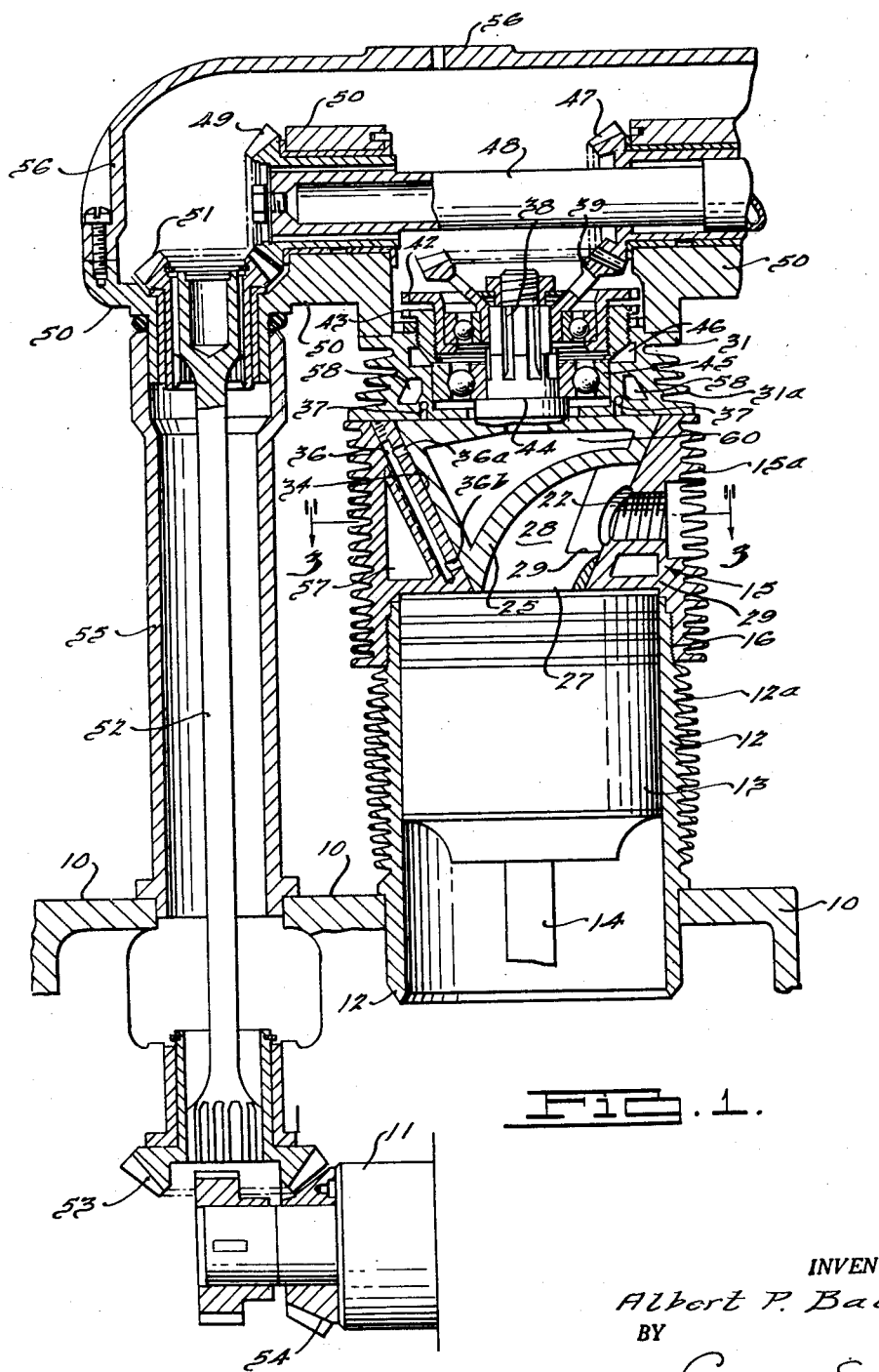
Fig. 1 is a vertical sectional view illustrating a portion of an internal combustion engine embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways.

Also it is to be understood that the phraseology or terminology employed herein is for the purpose of description and not of limitation.

In the drawings there is shown by way of example an internal combustion engine embodying the present invention. For the purpose of clarity only one cylinder of said engine is illustrated in the drawings, it being understood that the operative arrangement in other cylinders is similar to the one illustrated in the drawings. Portions of the engine such as the lower end of the connecting rod and a larger portion of the power shaft or crankshaft not forming a part of the present invention are omitted.

In describing the invention the part of the engine cylinder closer to the power shaft is referred to as the lower or inner end of the cylinder while the end of the cylinder remote from the power shaft is referred to as the upper or outer end of the cylinder. Similarly the direction toward the power shaft is called "downward" direction, and the direction away from the power shaft and toward the head of the cylinder is referred to as "upward" direction.

The engine herein illustrated and described is a multiple cylinder internal combustion engine particularly intended for use in various types of aircraft. The engine is of the gasoline type working on the Otto cycle and having spark ignition. It will be understood, however, that the invention is not limited to aviation engines and that it may be used with an equal degree of success for engines intended for automobiles, tractors, for various marine and stationary uses and the like. It will also be understood that other types of engines, such as engines working on Diesel cycle and using crude oil as fuel may also be constructed in accordance with the present invention.

Referring to the drawings and particularly to Fig. 1 thereof, the engine illustrated therein comprises a suitable crankcase 10 wherein there is operatively arranged in accordance with the requirements of the art a crankshaft or power shaft 11. To the crankcase 10 there is operatively secured a cylinder 12, the lower end whereof enters a corresponding opening in the crankcase 10 and is secured therein in a manner well known in the art. In the cylinder 12 there is slidably fitted a piston 13 having a connecting rod 14 which is operatively connected in a manner well known in the art (not shown) to the power shaft 11 for transmission of power thereto. The connecting rod 14 is intended for converting the reciprocating movements of the piston 13 into rotative movement of the crankshaft 11. The operative connection between the connecting rod 14 and the power shaft 10 is of any suitable character and since the same does not form a part of the present invention its illustration has been omitted. The lower end of the cylinder 12 opens into the crankcase 10, while its upper end is closed with the aid of a cylinder head.

The cylinder head comprises an intermediate section 15 having lower edges secured to the upper edges of the cylinder 12 in any suitable manner such as with the aid of screw threads, as indicated at 16. In the intermediate section 15 there is provided a generally frusto-conical valve seat or cavity 19, as well as an intake conduit 20, an exhaust conduit 21 and a spark plug nest or ignition device 22, all of them opening into said valve seat 19. In the valve seat 19 there is operatively arranged a rotary generally frusto-conical valve 25 having a body in the shape of a downwardly converging cone. The base 26 of said downwardly converging cone is made solid and is arranged to be the uppermost part of said cone while its midsection has a port 27 opening into the cylinder 12, thus forming a communication between said cylinder and a combustion chamber 28 formed in said cone body of the valve and provided with an uninterrupted curved outer wall. Opening against the lateral surface of the valve seat 19 is a window or side port 29, see Figs. 1 and 4. On the base 26 coaxially with the cone body of the valve there is provided a stub shaft 30 formed preferably integral with said base 26.

When the body of the rotary valve 25 is operatively arranged in the valve seat or cavity 19 and is rotated therein with the aid of suitable means, the window or port 29 thereof is adapted to register successively with the intake conduit 20, spark plug 22 and the exhaust conduit 21.

The base 26 is adapted to be in sliding contact with the lower surface of a top section 31 of the cylinder head, which top section is secured to the intermediate section 15 in any suitable manner such, for instance, as with the aid of screws 32.

It will now be clear in view of the foregoing that the valve seat 19 and the top section 31 of the cylinder head provide a positive enclosure for the body of the rotary valve 25 permitting only rotative movements thereof. Downward movement of the valve 25 is resisted by the tapered valve seat 19, while upward movements thereof are prevented by the top section 31. The conical surface of contact between the rotary valve 25 and the valve seat 19 indicated in Figs. 1 and 2 by the numeral 34 and the straight plane surface of contact 35 are amply lubricated with the aid of suitable lubricant supplied thereto through conduits 36 of the intermediate section 15 and oil conduit 37 of the top section 31, respectively, thereby insuring not only reduction of friction but also sealing of the corresponding members. The oil conduits 36 and 37 are operatively connected with an oil pump, not shown, adapted to be driven by the engine and to supply lubricant under pressure to said surfaces 34 and 35 through said conduits. The oil conduit 36 extends parallel to the tapered wall or bearing surface 34 of the valve cavity and communicates with the surface and the juxtaposed bearing surface of the valve by means of two ports or ducts 36a and 36b. The upper duct 36a is located at a point above the plane of the upper edge of the side port 29 and the lower duct 36b is located slightly below the plane of the lower edge of the side port. As a consequence these oil ducts are not exposed to the valve side port 29 during operation so as to occasion excessive loss of oil. Moreover, it is important to note that the ducts 36a and 36b are located between the intake and exhaust conduits and opposite the spark plug at the side of the valve seat subject to greatest pressure or load. At the time of firing considerable side thrust occurs against the wall opposite the spark plug and by arranging the oil inlets at this locality it is possible to maintain an adequate oil film at the surfaces under greatest load. The wiping action of the valve will adequately distribute over the bearing surfaces the oil conveyed to the valve seat at points 36a and 36b.

The stub shaft 30 is intended for rotating the rotary valve 25, and it is splined as indicated at 38, said splined portion thereof receiving a bevel gear 39 having a sleeve portion 40 correspondingly splined by which it engages said shaft.

On the sleeve portion 40 of the bevel gear 39 there is pressed the inner race of a ball bearing 41, the outer race whereof being pressed into and carried by a sleeve 42 which in turn is carried by an internally threaded adjustment sleeve 43 threaded into a nest provided in the top section 31. Onto the shaft 30 against the shoulder 44 thereof there is pressed the inner race of a thrust bearing 45, the outer race whereof enters the nest 46a formed in the bottom of the nest 46. From an examination of Fig. 2 it can be clearly seen that the outer race of the thrust bearing 45 is pressed downwardly and retained in place by the outside adjustment sleeve 43, while downward movements of the bearing 45 are resisted by the shoulder 44 provided on the shaft 30 and exerting force on the inner race of said thrust bearing 45. By rotating the adjustment sleeve 43 with the aid of a suitable wrench adapted to engage said sleeve at its peripheral edges indicated by the numeral 43a wherein suitable means are provided for engagement of such wrench, the bearing 45 may be vertically adjusted, thereby adjusting the vertical position of the rotary valve 45. Said adjustment is intended for proper positioning of the valve and adjustment of the pressure which the same exerts on the valve seat 19 and the straight contact surface 35. Similarly, by rotating the inside adjustment sleeve 42 the vertical position of the bevel gear 39 on the shaft 30 may be adjusted, thereby insuring proper engagement of the bevel gear 39 with its meshing gear 47 and insuring proper tooth pressure between the same.

Means are provided for positively connecting the gear 47 with the power shaft 11 for driving said gear and consequently the rotary valve 25. Said means of itself do not form a part of the present invention and only so much of details of the construction thereof is herein given as is necessary for complete understanding of the present invention. The gear 47 is mounted on a horizontal shaft 48 to which it is drivingly connected in any suitable manner such, for instance, as by splining (not shown). The shaft 48 carries another bevel gear 49 having a sleeve extension by which it is journalled in a housing 50 which also has another bevel gear 51 similarly journalled therein and meshing with the bevel gear 49 as best shown in Fig. 1. The bevel gear 51 is driven by a vertical shaft 52 to which it is connected by splining at the upper end of the shaft, the lower end of said shaft being adapted to be drivingly connected to the power shaft 11 by a pair of bevel gears 53 and 54. The vertical shaft 52 is housed within a tube 55 the upper end whereof is connected to the housing 50 and the lower end to the crankcase 10. The housing 50 has a cover 56 enclosing the driving mechanism.

The operation of the engine as far as the distribution of the fuel charge, igniting the same and expelling the exhaust gases may be best understood with reference to Figs. 1 and 3. As has been mentioned before, rotation of the valve 25 causes the port 29 thereof to register successively with the intake conduit 20, the spark plug nest 22 and the exhaust conduit 21 provided in the cylinder head. The rotation of the valve 25 is synchronized with the movements of the piston 13. As the piston starts on its intake stroke, the port 29 registers with the intake conduit 20, thus permitting the piston to draw the fuel charge through the port 29 and the conduit 28 into the cylinder. As the piston 13 approaches the end of its intake stroke, rotation of the valve 25 brings the valve 25 into the position when the port 29 thereof is out of registration with the intake conduit 20. Thereupon the piston 13 starts on the compression stroke. As the piston 13 approaches its upper dead center, the port 29 comes into registration with the spark plug 22 and ignition and "explosion" of the fuel charge occurs. This starts the piston 13 on its downward working stroke. As the piston 13 comes to the end of its working stroke, the port 29 continuing its rotative movement comes into registration with the exhaust port 21, thus providing an outlet for the exhaust gases which are still under considerable pressure. As the piston 13 moves up, the exhaust gases are expelled through the chamber 28 and the exhaust conduit 21 out of the cylinder, thus preparing the same for taking in a new charge when on the next cycle the port 29 comes into registration with the intake port.

In order to insure proper cooling of the cylinder in operation, the cylinder 12, the intermediate section 15 and the top section 31 are provided with cooling fins 12a, 15a and 31a respectively. In addition, the top section 31 and the intermediate section 15 of the cylinder head may be hollowed out as indicated at 57 and 58 respectively in order to provide a suitable fluid jacket. In order to assist in cooling the rotary valve 25 and to dissipate heat evenly from the conical body thereof, and to eliminate hot spots and excessive burning of oil on the bearing surfaces, the body of the valve is hollowed out as indicated at 60, the cavity thus formed being filled with a suitable heat conducting medium such as metallic sodium. Thus localized overheating of the valve at the region of combustion is reduced by distributing the heat over the body of the valve. Filling of the cavity 60 and removal of the heat conducting material therefrom is done through the bore 61 extending through the entire length of the shaft 30 and closed at the end of the shaft with the aid of a plug 62. By virtue of the heat distribution chamber or cavity 60 interposed between the combustion chamber 28 and the cooperating bearing surfaces of the valve and cylinder head at 34, it is possible to control more efficiently the temperature of the oil film at these surfaces and hence, increase the life of the engine.

By virtue of the above described construction, there is provided an improved internal combustion engine having a rotary valve forming in part a combustion chamber for said engine, which rotary valve is adapted to operate smoothly and without the danger of scoring due to the breaking of the film of lubricant between the mating surfaces receiving the maximum load. Means adapted to carry the maximum operation load are located at a point relatively remote from the hottest spot of the engine and are lubricated in such a manner that proper operation thereof is insured, whereby numerous advantages and objects of the present invention specifically listed above are attained. Although I have described the present valve as rotatable through the medium of its driving mechanism continuously in one direction it will be understood that the present invention is applicable to a rotatable valve of the oscillatable type.

I claim:

In an internal combustion engine having a cylinder, a reciprocable piston in said cylinder, and a cylinder head provided with a generally frusto-conical bearing surface bounding a valve cavity in communication with an exhaust conduit, an inlet conduit, and an ignition device provided in said cylinder head, a rotary valve having a generally frusto-conical bearing surface journaled within the bearing surface bounding said cavity, said valve also having a combustion chamber comprising a substantial portion of the combustion space, a port communicating between said combustion chamber and said cylinder, and a side port communicating with said combustion chamber and adapted to register successively and intermittently with said ignition device, exhaust conduit and intake conduit, said combustion chamber having a curved inner roof wall extending uninterruptedly from one port to the other and cooperating with an outer wall of said valve to enclose a chamber within said valve, a thermal conductive medium within said chamber, and oil conduit means for conveying oil directly to the outer bearing surfaces of the valve at separated points located at the opposite side of the cylinder head from said ignition device and between said inlet and exhaust conduits, said oil conduit means and cooperating bearing surfaces of the valve and head being separated from the combustion chamber by said thermal conductive medium in the valve when said valve side port registers with the ignition device at the time of firing, and said conduit means being unexposed to the valve side port during operation.

ALBERT P. BALL.

REFERENCES CITED

The following references are of record in the file of this patent:

UNITED STATES PATENTS

| Number | Name | Date |
|---|---|---|
| 880,601 | Thompson | Mar. 3, 1908 |
| 1,504,047 | Johnston | Aug. 5, 1924 |
| 1,545,336 | Lawrence | July 7, 1925 |
| 1,941,402 | Konstantinoff | Dec. 26, 1933 |
| 2,222,059 | Monleone | Nov. 19, 1940 |
| 2,305,874 | Isley | Dec. 22, 1942 |
| 2,364,658 | Ragsdale | Dec. 12, 1944 |
| 2,374,191 | Gernandt | Apr. 24, 1945 |

FOREIGN PATENTS

| Number | Country | Date |
|---|---|---|
| 231,381 | Great Britain | Apr. 2, 1925 |
| 451,245 | Germany | Oct. 24, 1927 |